(12) United States Patent
Frank et al.

(10) Patent No.: US 9,476,783 B2
(45) Date of Patent: Oct. 25, 2016

(54) SYSTEM AND METHOD FOR MAGNETICALLY COUPLING LOADS TO PRIME MOVERS AND DETECTING TRANSMITTED TORQUE

(71) Applicant: Baldor Electric Company, Fort Smith, AR (US)

(72) Inventors: Nicolas W. Frank, Greer, SC (US); Richard F. Schiferl, Chagrin Falls, OH (US)

(73) Assignee: Baldor Electric Company, Fort Smith, AZ (US)

( * ) Notice: Subject to any disclaimer, the term of this patent is extended or adjusted under 35 U.S.C. 154(b) by 0 days.

(21) Appl. No.: 14/279,998

(22) Filed: May 16, 2014

(65) Prior Publication Data

US 2015/0377723 A1    Dec. 31, 2015

(51) Int. Cl.
*G01L 3/02* (2006.01)
*F16D 7/02* (2006.01)
*H02K 49/00* (2006.01)
*H02P 15/00* (2006.01)
*G01L 3/08* (2006.01)

(52) U.S. Cl.
CPC ........................ *G01L 3/08* (2013.01)

(58) Field of Classification Search
None
See application file for complete search history.

(56) References Cited

U.S. PATENT DOCUMENTS

| 3,163,037 | A | * | 12/1964 | Kawabata | ................ | G01L 3/08 |
| | | | | | | 356/23 |
| 3,688,570 | A | * | 9/1972 | Burke, Jr. | ................ | G01L 3/08 |
| | | | | | | 250/231.14 |
| 4,102,052 | A | * | 7/1978 | Bloch | ...................... | G01D 5/00 |
| | | | | | | 33/286 |
| 6,054,788 | A | | 4/2000 | Dombrovski et al. | | |
| 7,217,193 | B2 | | 5/2007 | Nisley | | |
| 8,610,324 | B2 | * | 12/2013 | Grann | ................ | H02K 49/106 |
| | | | | | | 310/103 |
| 2014/0239875 | A1 | | 8/2014 | Melfi et al. | | |

\* cited by examiner

*Primary Examiner* — Michael A Lyons
*Assistant Examiner* — Jermaine Jenkins
(74) *Attorney, Agent, or Firm* — Taft Stettinius & Hollister LLP

(57) ABSTRACT

A magnetic coupling for transferring rotational motion from a prime mover to a load includes reference marks calibrated to indicate torque applied to the coupling during operation. A light source providing intermittent light flashes permits a user to visibly discern the relative rotational position of the reference marks to one another, and thereby determine the torque applied to the coupling.

20 Claims, 7 Drawing Sheets

SYSTEM AND METHOD FOR MAGNETICALLY COUPLING LOADS TO PRIME MOVERS AND DETECTING TRANSMITTED TORQUE

FIELD OF INVENTION

The present disclosure concerns magnetic couplings for connecting a load to a prime mover such as an electric motor. In particular, the present disclosure concerns magnetic couplings of loads to prime movers and measurement of torque applied by such prime movers on such loads.

BACKGROUND

Measuring torque imparted by a prime mover, including but not limited to electric motors, combustion engines, or other mechanism that transforms energy to rotational motion, to a load can involve torque sensors that measure distortion of a shaft under the full torque applied to the load, such as a motor shaft or shaft coupled to the load used to transfer torque from the prime mover to the load. Output signals from such sensors cannot be interpreted by users without processing and translation of electrical values into a readable output through electrical circuitry or other equipment. However, such sensors can be expensive, and due to its proximity to operating machinery can be prone to damage. A system and method for determining torque without the use of such sensors is therefore desirable.

SUMMARY

A magnetic coupling for transferring rotational motion from a prime mover to a load includes reference marks calibrated to indicate torque applied to the coupling during operation. A light source providing intermittent light flashes permits a user to visibly discern the relative rotational position of the reference marks to one another, and thereby determine the torque applied to the coupling.

BRIEF DESCRIPTION OF THE DRAWINGS

In the accompanying drawings, structures and methods are illustrated that, together with the detailed description provided below, describe aspects of a system and method for magnetically coupling loads to prime movers such as electric motors. It will be noted that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
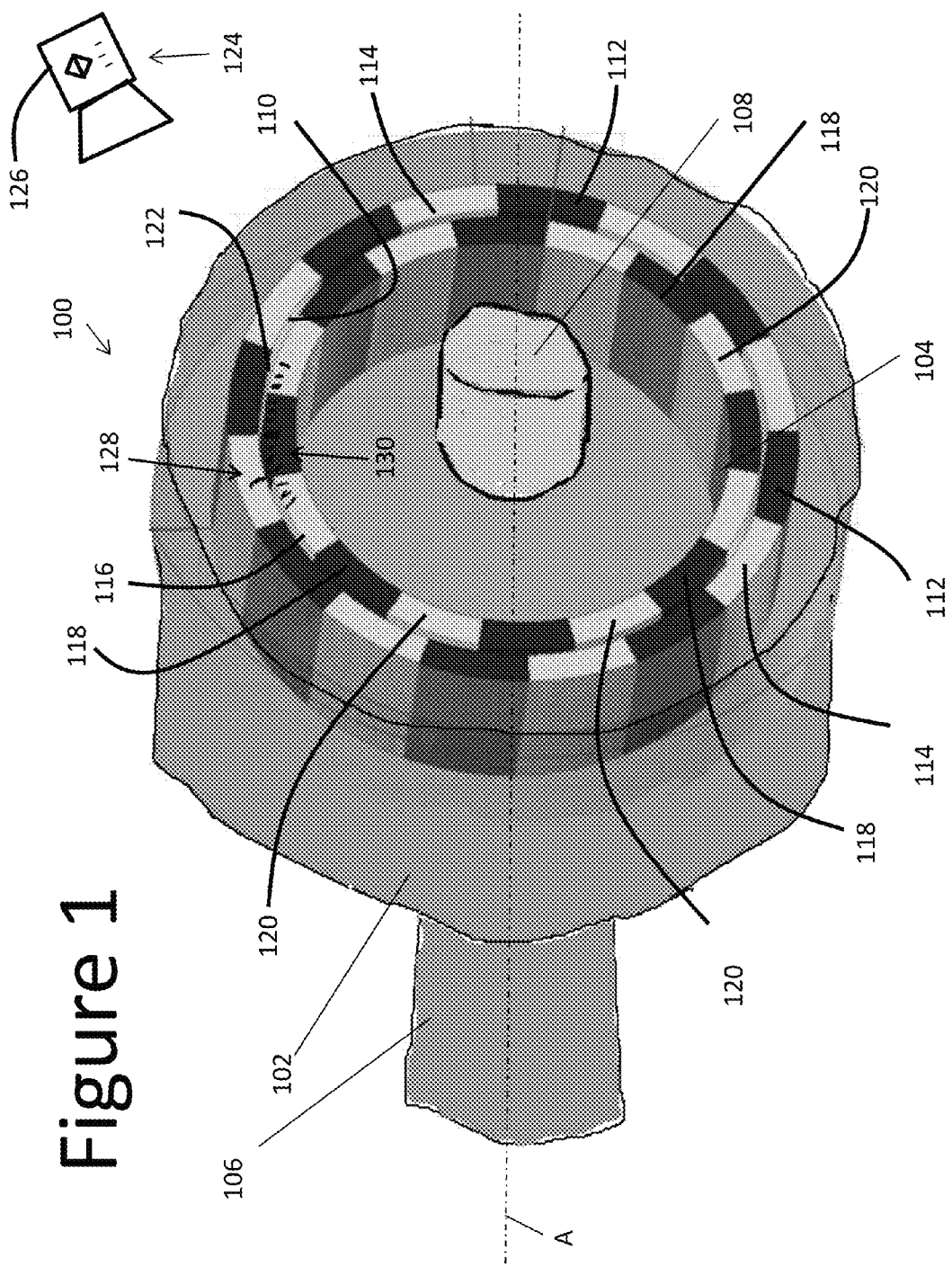
FIG. 1 illustrates a perspective diagrammatic view of a coupling 100.

With reference to FIG. 1, a magnetic coupling 100 according to the present teachings includes two members which are a pair of opposing rotors 102 and 104 attached to output shaft 106 and input shaft 108, respectively. According to one aspect of the present teachings, the rotors 102, 104 are secured to the respective shafts 106, 108 so that the shafts 106, 108 move with the same rotational motion as its respective rotor 102, 104. A variety of different manners of securing the rotors 102, 104 to shafts 106, 108 are possible according to the present teachings, such as welds, fasteners, interfering fits and others. Each shaft 106, 108 can rotate with the same rotational motion about the longitudinal axis of rotation A as the respective rotor 102, 104 to which it is attached.

The rotor 102 has an interfacing wall 110 that forms a cylindrical surface centered about and facing the axis of rotation A. As used herein, a surface faces a direction perpendicular to the surface and away from the object of which the surface is a part. Moreover, different points on a surface need not face a direction parallel to another point on the same surface. For example, the curved surface of a solid cylinder faces radially outwardly from the longitudinal axis of the cylinder and away from the cylinder as opposed to toward the center of the cylinder. With continued reference to FIG. 1, a series of magnetic poles 112, 114 are arranged on the surface of the wall 110 with polarities alternating along the circumferential direction. Rotor 104 has an interfacing wall 116 that forms a cylindrical surface centered about the axis of rotation A and facing radially outward, perpendicular to the axis of rotation A. A series of magnetic poles 118, 120 are arranged on the surface of the wall 116 with polarities alternating along the circumferential direction.

The interfacing wall 110 of the rotor 102 has a shape complementary to the interfacing wall 116 of rotor 104. According to one aspect of the present teachings, the interfacing walls 110, 116 of the opposing rotors 102, 104 both have cylindrical shapes, the rotor 104 having a smaller diameter and fitting within the volume partially formed by the interfacing wall 110. According to one aspect of the present teachings, each of the magnetic poles 112, 114 on the surface of the wall 110 has a corresponding magnetic pole of opposite polarity among poles 118, 120 of wall 116. According to another aspect of the present teachings, the number of poles on wall 116 is equal to the number of poles on wall 110. The rotors 102, 104 each have eight poles of each of the two opposite polarities, totaling 16 poles on each of the rotors. Each of the illustrated poles 112, 114, 118, 120 spans 22.5 degrees of arc about the circumference of the respective rotor 102, 104 on which the poles 112, 114, 118, 120 are disposed. The illustrated coupling 100 has eight stable equilibrium points and eight unstable equilibrium points, the positions of which are maintained for any given transmitted torque.

Figure 2:
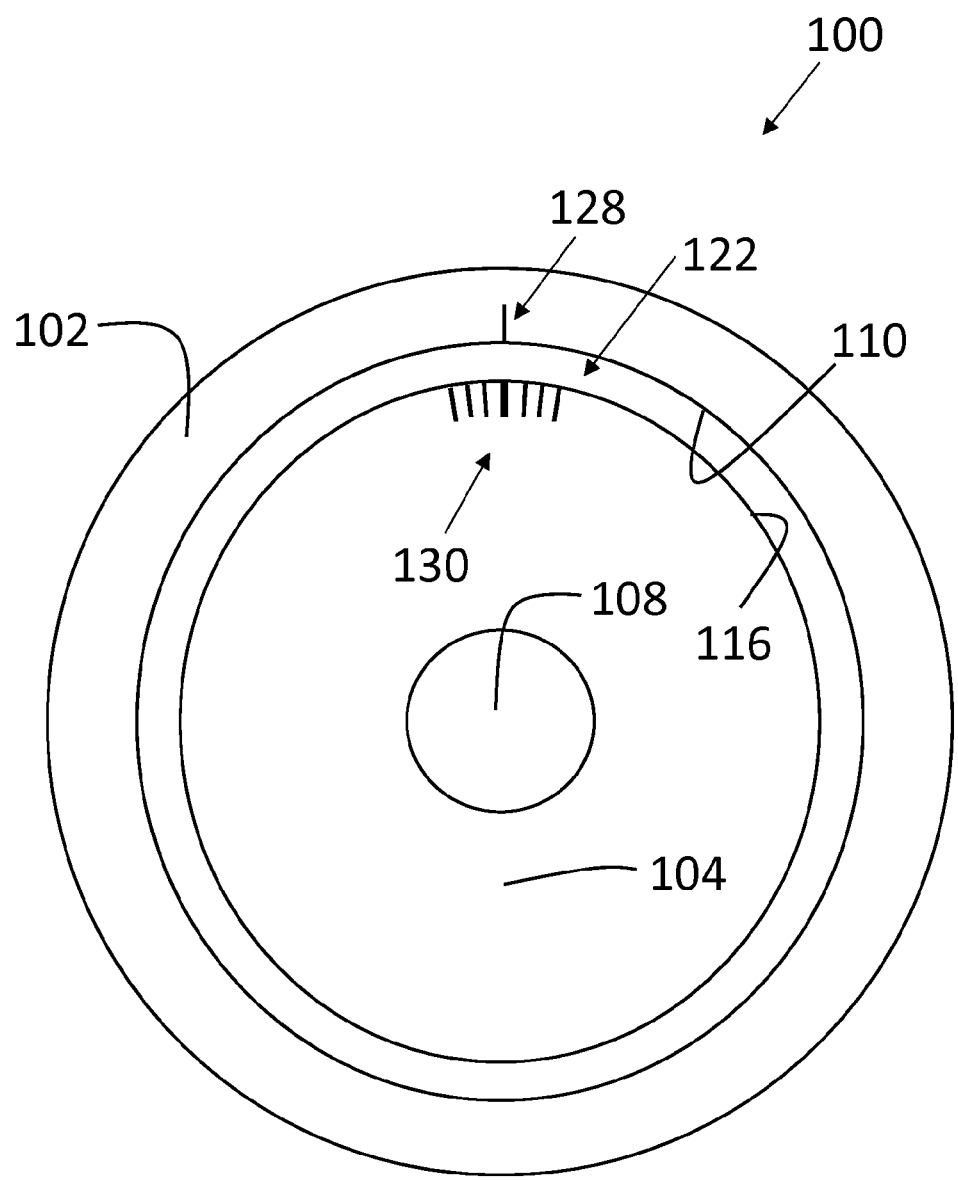
FIG. 2 illustrates a front view of coupling 100.
Figure 3:
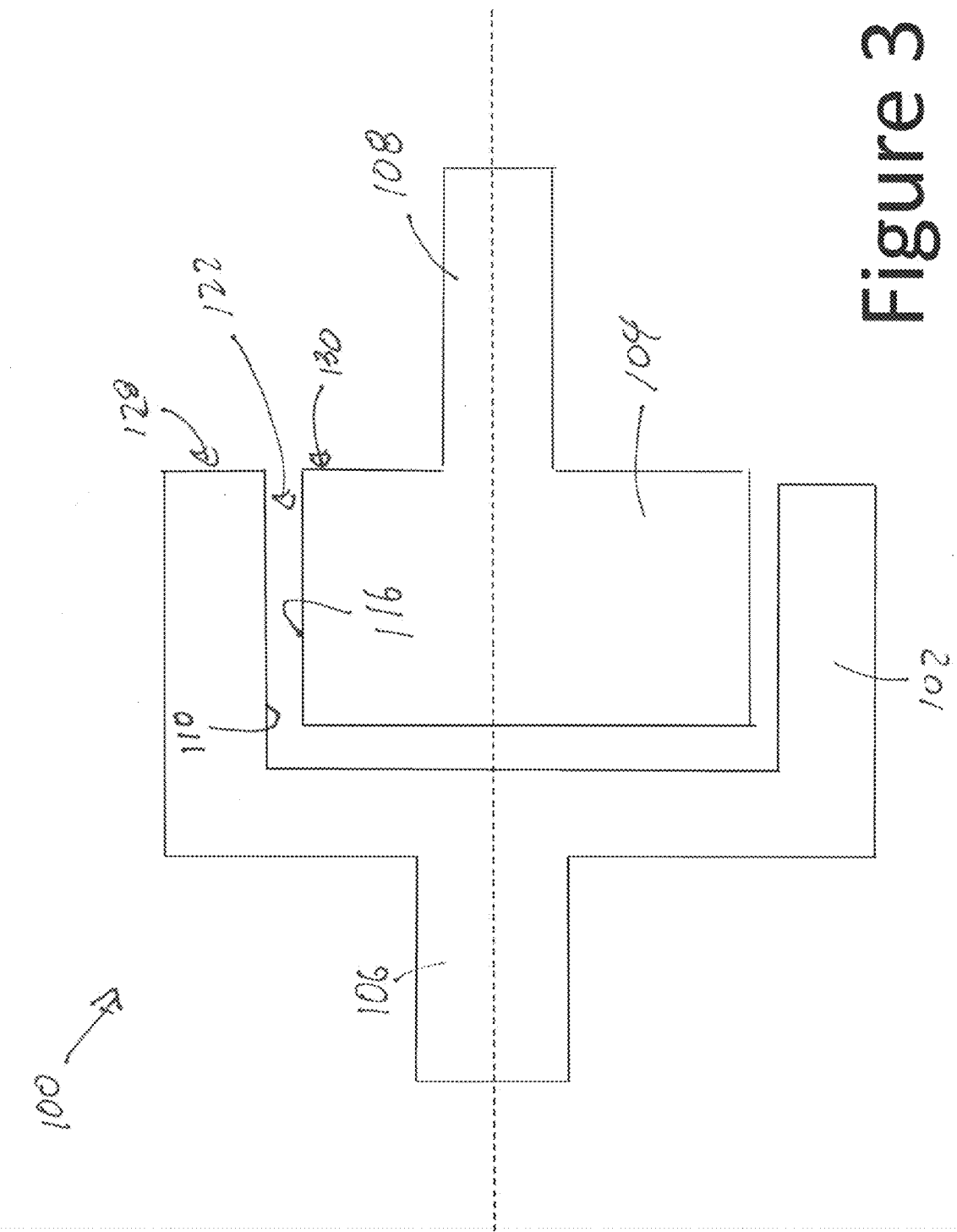
FIG. 3 illustrates a sectional side view of coupling 100.

With reference to FIGS. 1 and 2, the rotors 102, 104 are fixed with respect to one another in the longitudinal direction and are permitted rotational motion about the axis A relative to one another. The fixed longitudinal relationship can be achieved by having a load operating at a fixed location and secured to the output shaft 106 and a prime mover at a fixed location and secured to the input shaft 108. Other suitable devices and methods for fixing the rotors 102, 104 can be implemented according to the present teachings, including but not limited to securing the rotors 102, 104 to one or more mounts. Movement of the rotors 102, 104 relative to one another is influenced by the magnetic fields formed by the opposing sets of poles 112, 114 and 118, 120 and the interaction of these fields with the poles 112, 114, 118, 120. As shown in FIG. 3, the torque resulting from relative rotation of the rotors 102, 104 depends on the rotational displacement of the rotors 102, 104 relative to one another. The rotors exert zero torque at a point where each pole 112, 114 on wall 110 is aligned with each pole 118, 120 of opposite polarity on wall 116 such that a stable equilibrium position is reached. The coupling 100 also has unstable equilibrium positions where poles 112, 114 on wall 110 are aligned with the poles 118, 120 of the same polarity on wall 116. Displacement from these unstable equilibrium points introduces torque in the direction of the displacement.

According to one aspect of the present teachings, a prime mover secured to the input shaft 108 can drive a load secured to the output shaft 106. The arrangement of magnetic poles on the rotors 102, 104 across an air gap 122 formed between walls 112, 116 permits the coupling 100 to transfer torque in a synchronous manner.

The arrangement of poles on coupling 100 is not limiting as a variety of other arrangements of magnetic poles on the first and second rotor members of a coupling permit synchronous transfer of torque according to the present teachings. For example, more or less total number of poles can be implemented while still achieving synchronous operation at the desired loads. Further, while poles 112, 114, 118, 120 have a uniform cross-section along the longitudinal direction, a coupling according to the present teachings is not so limited, and can have, for example, alternating poles in the longitudinal direction on both rotors 102, 104, poles of non-uniform longitudinal shape or orientation, poles of non-uniform radial shape or orientation or various combinations of the poles referred to herein. Magnetic poles can be implemented though use of permanent magnets, conducting windings, magnetic saliency or other available structures and methods that result in the desired magnetic pole arrangement.

With further reference to FIG. 1, a strobe light 124 flashes intermittently at a predetermined frequency ω that is adjustable at controller 126. A reference mark 128 in the form of a single humanly visible indicator mark is found on the first rotor 102, and a series of humanly visible reference marks 130 in the form of multiple calibrated measurement marks are found on the second rotor 104. The reference mark 128 is proximate to the second rotor 104, disposed at an edge adjacent to the air gap 122. Moreover, reference mark 128 can be in a position proximate to the series of reference marks 130 on the second rotor. The marks 128, 130 can be fixed with respect to the rotor 102, 104 on which they are disposed. The rotational position of the reference marks 128, 130 relative to one another indicates the relative rotational displacement of the first rotor 102 with respect to the second rotor 104 and thus torque. According to another aspect of the present teachings, the calibrated reference marks 130 can have torque value imprinted adjacent the corresponding mark such that the torque values are visibly discernable for the rotational displacement corresponding to each of the calibrated reference marks 130. A variety of different types of marks 128. 130 can be suitable according to the present teachings, including but not limited to recessed marks, raised marks, painted marks, etched marks and other marks permitting a human user to view the mark during operation of the prime mover driving the coupling. Moreover, marks such as marks 128, 130 need not be of the same type on both rotors. In one non-limiting example permutation, a coupling can have one or more etched marks on one rotor, and one or more painted marks on the opposing rotor.

Figure 4:
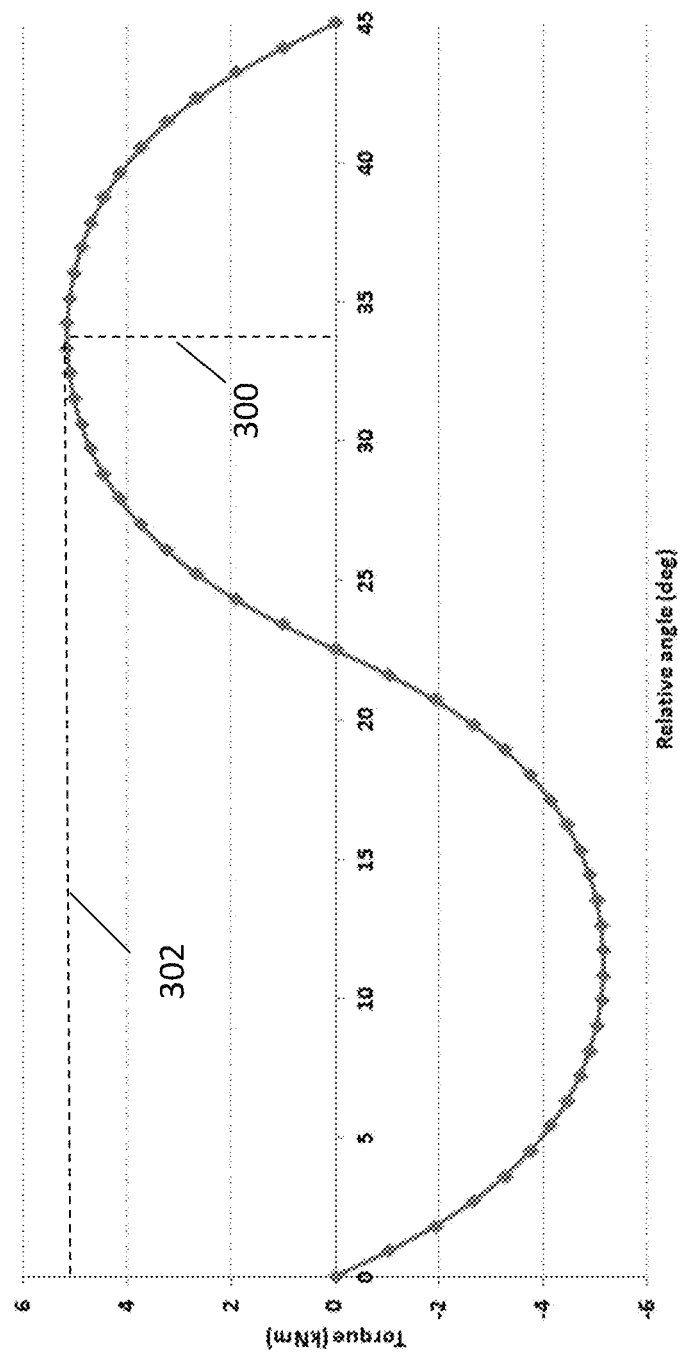
FIG. 4 illustrates a graph of torque versus angular displacement of the coupling 100.

FIG. 4 illustrates the torque applied to the input shaft 108 and output shaft 106 over 45 degrees of displacement about a stable equilibrium point at 22.5 degrees, which point corresponds to a position of the rotors 102, 104 such that each of the poles 112, 114 of rotor 102 are aligned with a pole 118, 120 having the opposite polarity, respectively, on rotor 104. According to FIG. 4, the torque applied to the coupling 100 as shown in FIG. 1, which is displaced at about positive 11.5 degrees from stable equilibrium, corresponds to value of torque at 34 degrees rotational displacement as indicated by reference line 300, or about 5000 Newton-meters, as indicated by the position of line 302 along the dependent torque axis.

During synchronous operation, the strobe light 124 can be adjusted to flash light onto the marks 128, 130 with about the same frequency with which the coupling 100 rotates. The frequency can be sufficiently the same as the rotation of the coupling 100 when the light flashes project onto the marks 128, 130 over at least several seconds such that a human has sufficient time to view the relative position of the marks 128, 130. Projection of intermittently flashing light onto the marks can allow a human user to visually inspect the relative position of the marks 128, 130 with respect to one another even while the coupling 100 is rotating at high speeds. In this manner, the user can visually determine the torque applied by the coupling 100 to the load through the output shaft 106.

According to one aspect of the present teachings, the strobe light can flash at intervals spaced apart by an integer number of the period of at least one of the rotors 102, 104. This will also allow a user to visually determine the relative position between the rotors 102, 104, and thus the applied torque even though the user is not able to see the marks 128, 130 on every rotation, but instead every second, third, fourth or other integer number of rotations. In addition to strobe lights, other lighting devices that provide periodic light flashes can be implemented.

Figure 5:
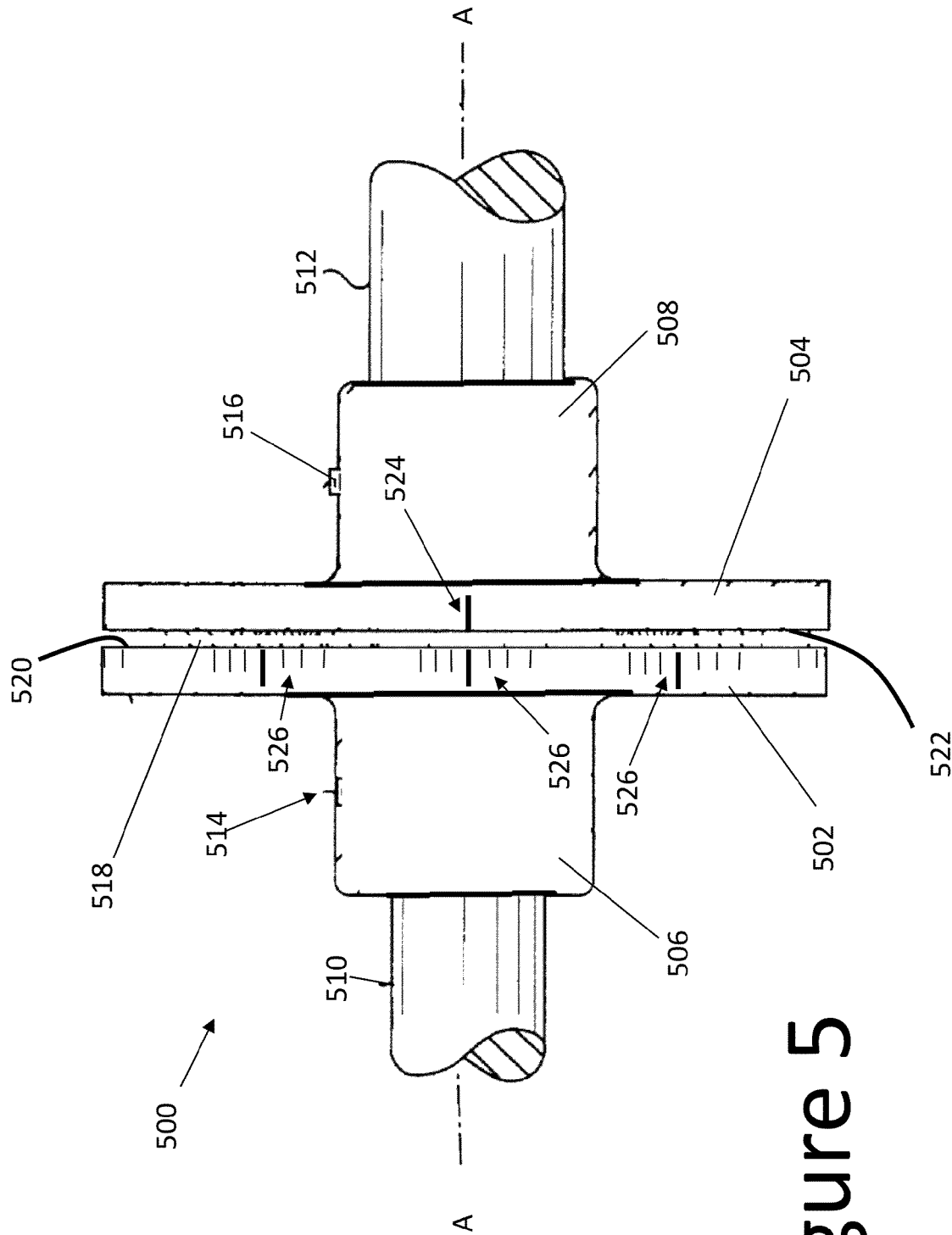
FIG. 5 illustrates a side view of coupling 500.
Figure 6:
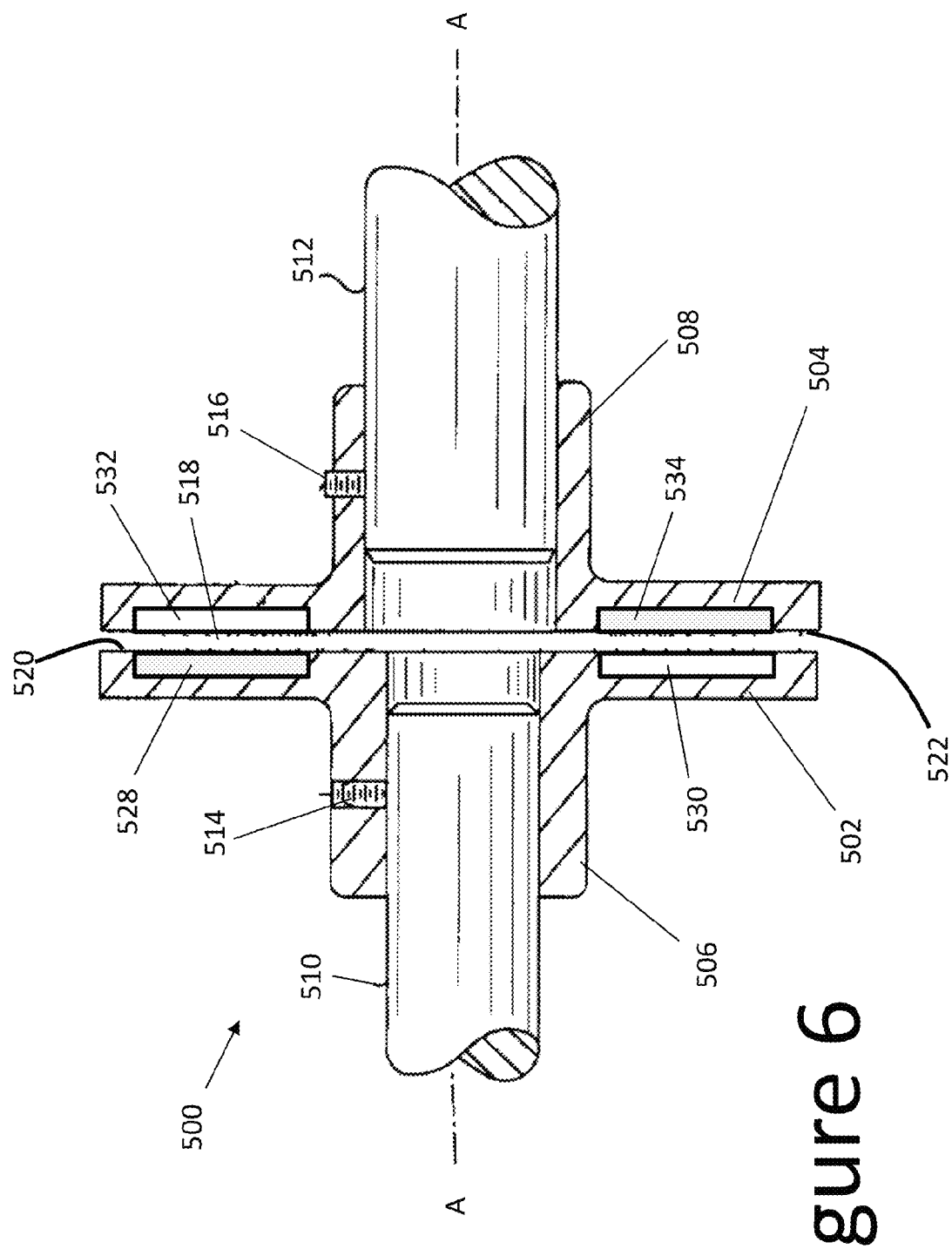
FIG. 6 illustrates a sectional side view of coupling 500.

With reference to FIGS. 5 and 6, a coupling 500 according to the present teachings has two coupling members in first and second rotors 502, 504. The rotors 502, 504 have respective collars 506, 508 in which shafts 510, 512, respectively are inserted and secured with fasteners 514, 516. The fasteners 514, 516 also secure the rotors 502, 504 axially, maintaining their relative position along rotational axis A, which forms an air gap 518 between the rotors 502, 504. The first and second rotors 502, 504 are both axially facing, having a first interfacing wall 520 and second interfacing wall 522 that are both perpendicular to the longitudinal axis A and having each wall 520, 522 facing the other wall 522, 520. A single visible indicator mark 524 is disposed on rotor 504, while multiple sets of visible reference marks 526 are disposed on rotor 502. The indicator marks 524, 526 are disposed on the edge of the respective rotors 504, 502 adjacent the air gap 518 and proximate to the marks 526, 524 on the opposing rotor.

The marks 524, 526 can be fixed with respect to the rotor 502, 504 on which they are disposed. The rotational position of the reference marks 524, 526 relative to one another indicates the relative angular displacement of the rotors 502, 504 with respect to one another. According to another aspect of the present teachings, the reference marks 526 can have torque value imprinted adjacent the corresponding mark such that the torque values are known for the rotational displacement corresponding to the indicator mark 524 aligning with a respective reference marks 526. According to one aspect of the present teachings, multiple sets of reference marks 526 can be implemented with each set corresponding to one of multiple stable equilibrium positions of the rotors 502, 504 relative to one another.

With reference to FIG. 6, the rotor 502 has magnet poles 528, 530 of opposite polarity disposed at the interfacing wall 520. Further, the rotor 504 has magnetic poles 532, 534 of opposite polarity disposed on interfacing wall 522. The arrangement of poles 528, 530, 532, 534 can provide multiple stable equilibrium positions over the 360 degree relative range of motion of the rotors 502, 504 to one another. As the relative rotational position of the rotors 502, 504 is displaced from one of the equilibrium positions, the resulting torque on the rotors 502, 504 from the magnetic interaction of the poles 528, 530, 532, 534 increases from zero torque to a nonzero value in the opposite direction of the displacement. This torque can increase with increased relative displacement until an unstable equilibrium point is reached. Relative displacement past an unstable equilibrium point can result in a change in direction of the torque applied to the rotors 502, 504 such that the torque is directed to an adjacent stable equilibrium position, rather than toward the equilibrium position from which the rotors 502, 504 were originally displaced. In such instances of slip, which can for example occur during startup of an electric motor as prime mover, or while driving loads near the rated limit of the coupling 500, the indicator mark 524 can align with a different one of the sets of reference markings 526. According to another aspect of the present teachings, the coupling 500 permits synchronous operation of the rotors 502, 504.

Figure 7:
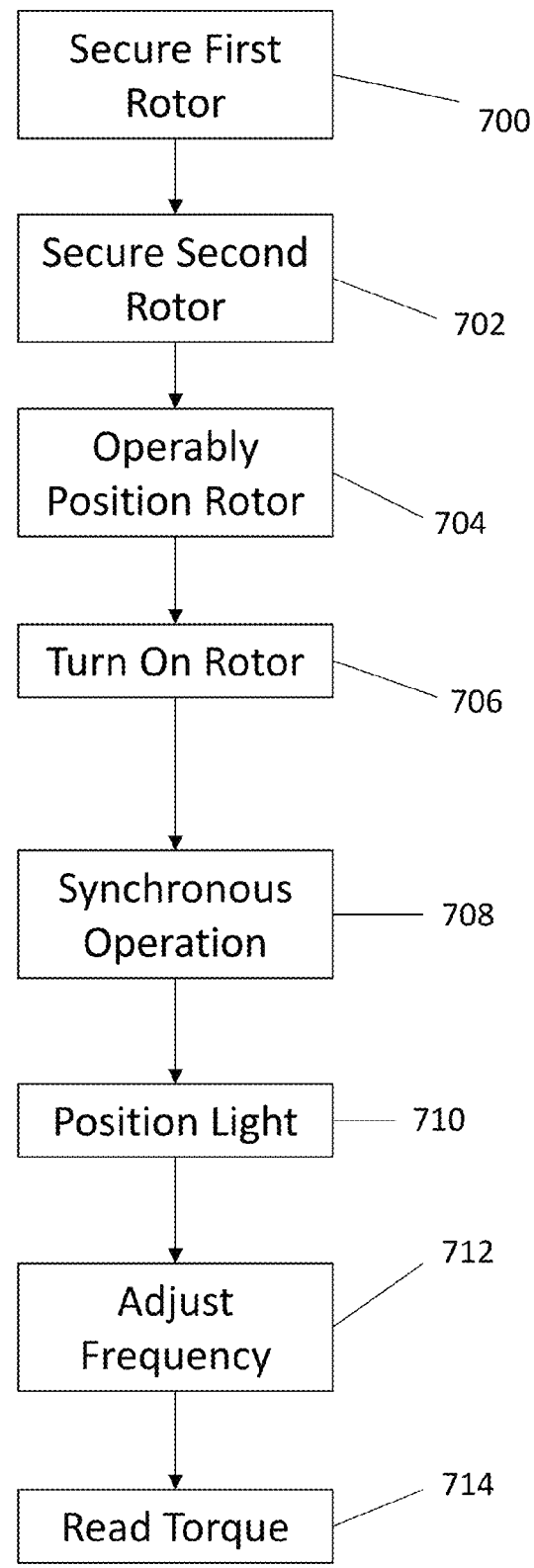
FIG. 7 illustrates a method of driving a load including a magnetic coupling.

With reference to FIG. 7, a method of driving a load with a magnetic coupling includes securing the first rotor having torque reference markings to a prime mover in step 700. In step 702 a second rotor having torque reference markings is secured to a load. In step 704, the interfacing wall including magnetic poles of the first rotor is operably positioned with respect to the interfacing wall including magnets of the second rotor. It should be noted that the order of steps 700 and 702 can be performed in any order or coincidentally, and the step of operably arranging the opposing interfacing walls of the rotors can be performed coincidentally with one or both of steps 700, 702. In step 706, the prime mover is turned on. In step 708, the coupling reaches synchronous operation. In step 710, a strobe light is positioned so to project intermittent light on the markings of the first and second rotor during operation. In step 712, the strobe frequency and position is adjusted to match the frequency of the coupling and project on the reference markings during the instances of intermittent light flashes. Steps 710 and 712 can be performed in any order, and can also be performed independently of steps 700, 702, 704, 706, 708. In step 714, a user reads the torque by determining the relative rotational position of the reference markings on the opposing rotors.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. To the extent that the terms "in" or "into" are used in the specification or the claims, it is intended to additionally mean "on" or "onto." As used herein, "about" will be understood by persons of ordinary skill in the art and will vary to some extent depending upon the context in which it is used. Unless otherwise understood by persons of ordinary skill in the art, "about" will mean up to plus or minus 10% of the particular term. From about A to B is intended to mean from about A to about B, where A and B are the specified values.

While the present disclosure illustrates various embodiments, and while these embodiments have been described in some detail, it is not the intention of the applicant to restrict or in any way limit the scope of the claimed invention to such detail. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

The invention claimed is:

1. An article of manufacture comprising:
    a first coupling member having a first interfacing wall including a first plurality of magnetic poles arranged alternately about a circumference of the first interfacing wall;
    a second coupling member having an second interfacing wall complimentary to the first interfacing wall and including a second plurality of magnetic poles arranged alternately circumferentially;
    wherein the first coupling member and second coupling member are securable to at least one of a prime mover and load such that the first interfacing wall and second interfacing wall are spaced apart by an air gap, are disposed to permit rotational motion relative to one another about an axis of rotation and can synchronously transfer rotational motion about the axis of rotation from a prime mover to a load;
    at least one visible reference mark on the first coupling member proximate to the second coupling member; and,
    at least one visible reference mark on the second coupling member proximate to the at least one visible reference mark on the first coupling member.

2. The article of manufacture of claim 1, further comprising:
    a strobe light operable to flash at intervals having a period about equal to a integer multiple of a period of rotation of at least one of the first coupling member and second coupling member.

3. The article of manufacture of claim 2 wherein the strobe light is operable to flash at about the same period as the period of rotation of at least one of the first coupling member and second coupling member.

4. The article of manufacture of claim 1, wherein the first interfacing wall and second interfacing wall face an axial direction relative to the axis of rotation.

5. The article of manufacture of claim 4, wherein the first interfacing wall faces axially in a first direction relative to the axis of rotation, and second interfacing wall faces axially in a second direction opposite the first direction.

6. The article of manufacture of claim 1, wherein the first interfacing wall and second interfacing wall face a radial direction relative to the axis of rotation.

7. The article of manufacture of claim 6, wherein the first interfacing wall faces radially inwardly relative to the axis of rotation, and second interfacing wall faces radially outwardly relative to the axis of rotation.

8. The article of manufacture of claim 1, wherein at least one of the at least one visible reference mark on the first rotor and at least one visible reference mark on the second rotor include a plurality of visible reference marks calibrated to a torque applied to the first and second rotors about the axis of rotation.

9. The article of manufacture of claim 8, wherein the other of the at least one of the at least one visible reference mark on the first rotor and at least one visible reference mark on the second rotor includes an indicator mark.

10. A method of operating a magnetic coupling, comprising:
securing a first rotor of a magnetic coupling to a prime mover, the first rotor having a first interfacing wall including a plurality of magnetic poles and at least one first torque reference mark;
securing a second rotor of a magnetic coupling to a load, the second rotor having a second interfacing wall including a plurality of magnetic poles and at least one second torque reference mark;
positioning the first rotor and second rotor relative to one another to form an air gap between the first interfacing wall and second interfacing wall such that the first rotor can synchronously rotate the second rotor and load about an axis of rotation;
driving the first rotor with the prime mover; and,
projecting intermittent light flashes from a light source onto the at least one first torque reference mark and at least one second torque reference mark.

11. The method of claim 10, wherein the positioning step includes positioning the first rotor and second rotor relative to one another wherein the at least one first torque reference mark and at least one second torque reference mark can be positioned proximate to one another by relative rotation of the first and second rotor.

12. The method of claim 10, wherein the positioning step includes positioning the first rotor and second rotor relative to one another wherein the at least one first torque reference mark and at least one second torque reference mark are adjacent the air gap.

13. The method of claim 10, wherein the projecting step includes positioning the light source to project intermittent light flashes onto the at least one first torque reference mark and the at least one second torque reference mark.

14. The method of claim 10, further comprising:
adjusting frequency of the intermittent light flashes to about a frequency of rotation of at least one of the first rotor and second rotor.

15. The method of claim 10, further comprising:
positioning a first interfacing wall of the first rotor and the second interfacing wall of the second rotor to face in an axial direction relative to an axis of rotation.

16. The method of claim 15, further comprising:
positioning a first interfacing wall to face in a direction opposite to the direction the second interfacing wall faces.

17. The method of claim 10, further comprising:
positioning a first interfacing wall of the first rotor and the second interfacing wall of the second rotor to face in a radial direction relative to an axis of rotation.

18. The method of claim 17, further comprising:
positioning a first interfacing wall to face in a direction opposite to the direction the second interfacing wall faces.

19. An apparatus comprising:
a first coupling member having a first interfacing wall including a first plurality of magnetic poles arranged alternately about a circumference of the first interfacing wall;
a second coupling member having an second interfacing wall complimentary to the first interfacing wall and including a second plurality of magnetic poles arranged alternately circumferentially;
wherein the first coupling member and second coupling member are securable to at least one of a prime mover and load such that the first interfacing wall and second interfacing wall are spaced apart by an air gap;
at least one visible reference mark on the first coupling member proximate to the second coupling member; and,
at least one visible reference mark on the second coupling member proximate to the at least one visible reference mark on the first coupling member.

20. The apparatus of claim 19, further comprising a plurality of sets of visible reference marks on at least one of the first and second coupling members.

* * * * *